United States Patent [19]

Kruse

[11] Patent Number: 4,604,018

[45] Date of Patent: Aug. 5, 1986

[54] HAY BALE LOADER

[76] Inventor: Marvin F. Kruse, Rte. 3, Box 178, Tecumseh, Nebr. 68450

[21] Appl. No.: 645,405

[22] Filed: Aug. 29, 1984

[51] Int. Cl.⁴ ...................... A01D 87/12; B65G 57/24
[52] U.S. Cl. ...................................... 414/44; 198/374;
  198/434; 198/443; 294/81.6; 294/107; 294/121;
  414/62; 414/71; 414/111; 414/501
[58] Field of Search ...................... 414/38, 44, 62, 70,
  414/71, 111, 501; 294/81 R, 87 R, 61, 107, 121,
  81.6, 87.1; 198/415, 434, 663, 675, 374, 443

[56] References Cited

U.S. PATENT DOCUMENTS

| | | | |
|---|---|---|---|
| 1,342,220 | 6/1920 | Lewis et al. | 198/415 |
| 2,205,550 | 6/1940 | Wehr | 294/121 X |
| 3,443,699 | 5/1969 | Lundahl | 414/44 X |
| 3,596,777 | 8/1971 | Neely | 414/44 X |
| 3,757,966 | 9/1973 | Cox et al. | 414/64 |
| 3,788,495 | 1/1974 | Fachini et al. | 414/44 X |
| 3,876,093 | 4/1975 | Carriere | 294/107 X |
| 4,247,239 | 1/1981 | Miguel | 414/44 |
| 4,273,488 | 6/1981 | Hill et al. | 414/44 |
| 4,295,772 | 10/1981 | Zimmerman | 414/38 |

FOREIGN PATENT DOCUMENTS 40473  2/1915  Sweden ............................ 294/121

Primary Examiner—Leslie J. Paperner
Attorney, Agent, or Firm—Lowe, Price, LeBlanc, Becker & Shur

[57] ABSTRACT

A motorized device for retrieving rectangular objects and stacking said objects on a pallet is described. The device includes a conveyor for picking up objects such as hay bales from the ground and a manipulator for taking bales from the conveyor and orienting them either lengthwise or crosswise. The oriented bales are then individually transported to an accumulator in the desired orientation to form a layer. When the layer has been formed on the accumulator, a carriage is translated forward and downward to engage the layer and pick the layer up, moving the carriage and layer of bales rearwardly to deposit them on a pallet. Successive layers are formed in this fashion until a stack of the desired height is disposed on the pallet. The device then may transport the palletized load to a storage or transport area where the load may be moved by forklift truck.

11 Claims, 19 Drawing Figures

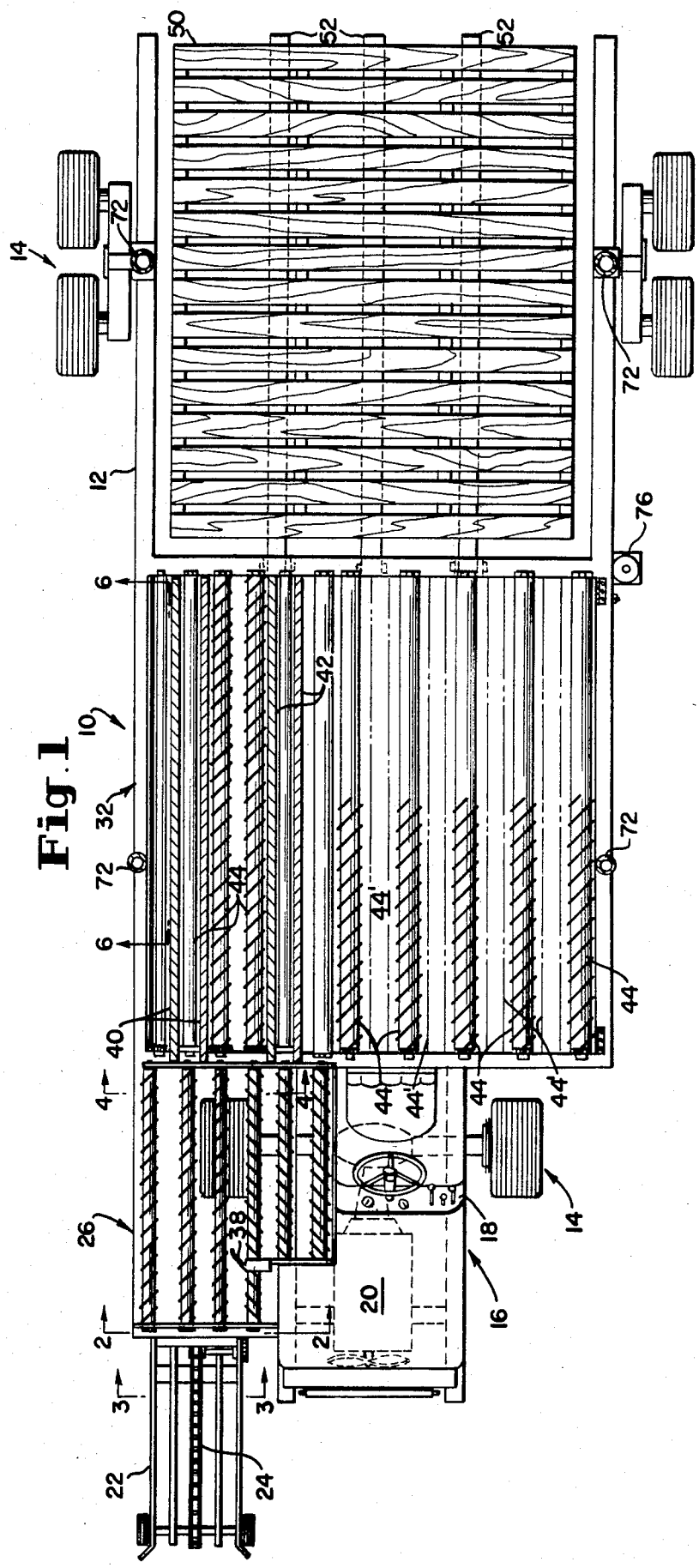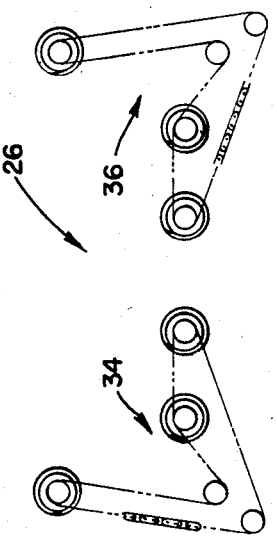

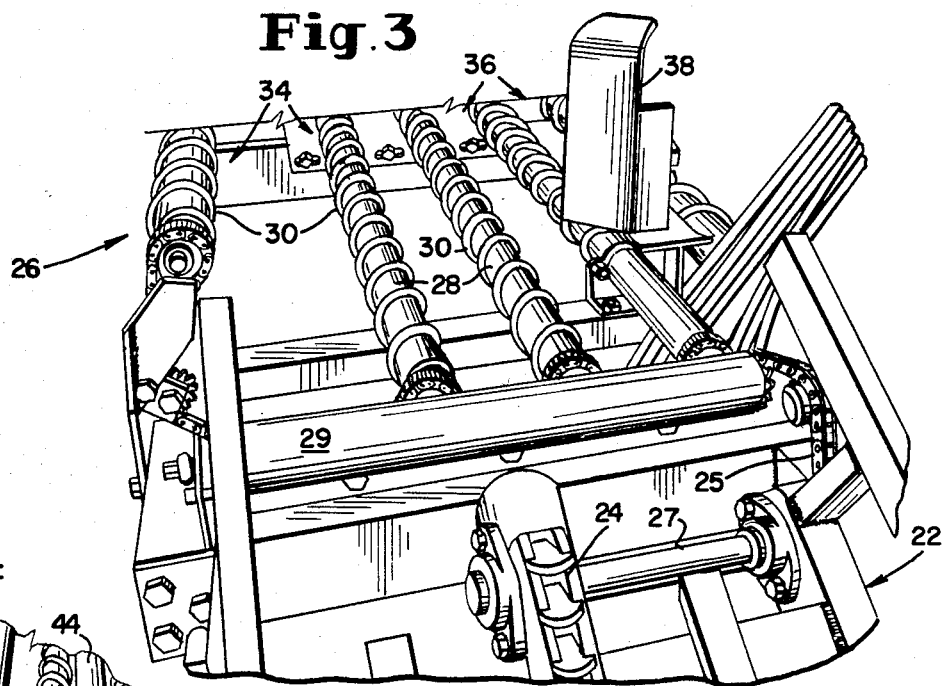
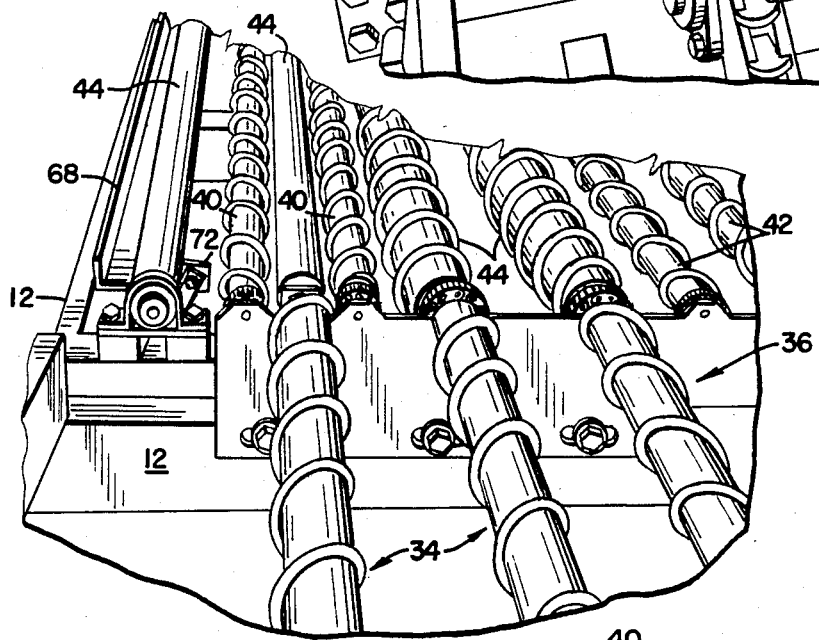
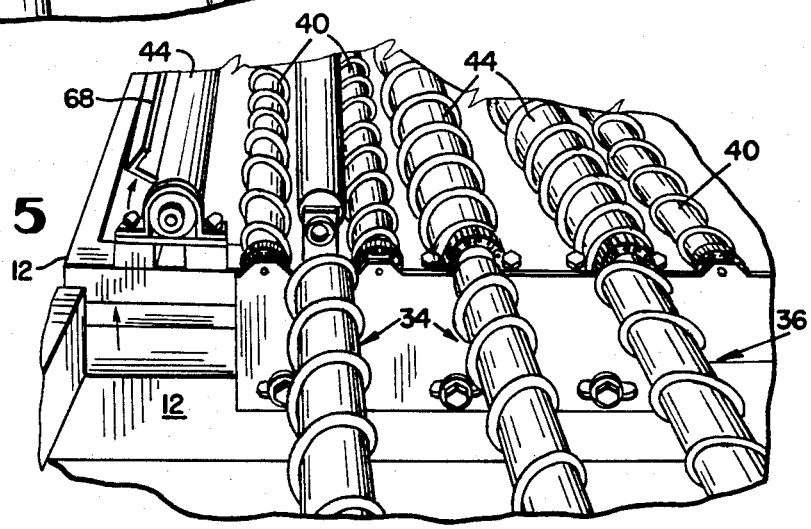

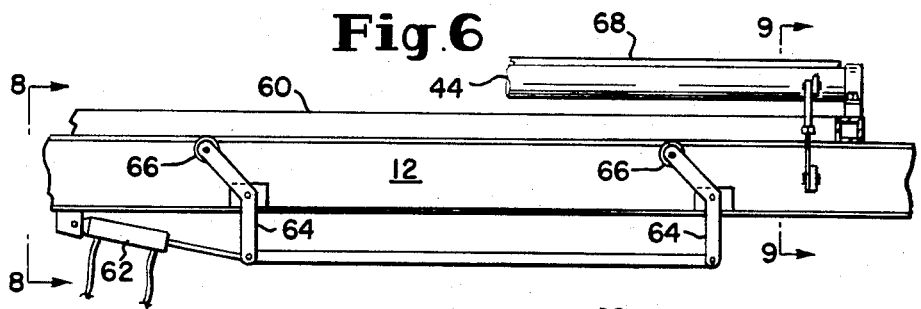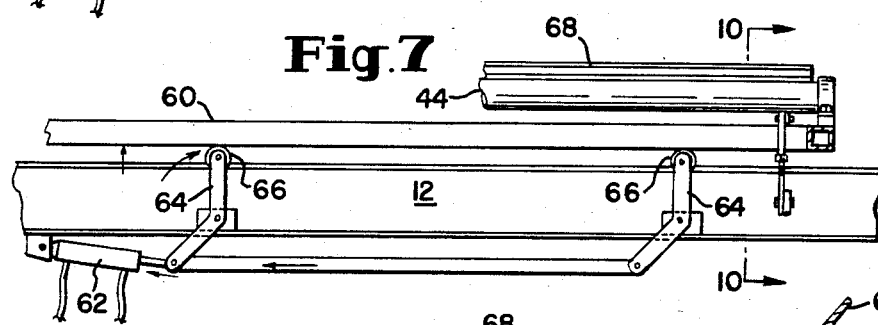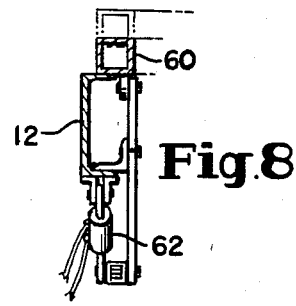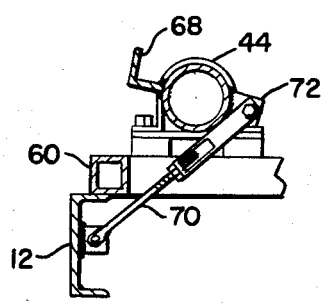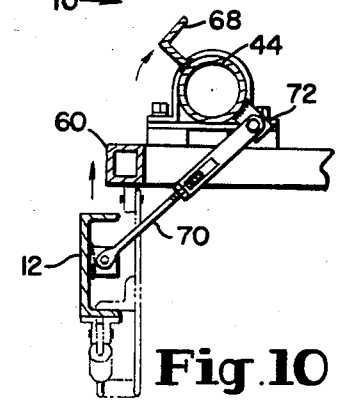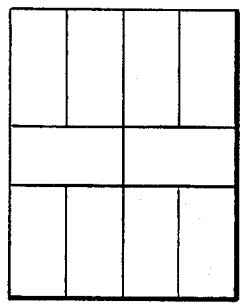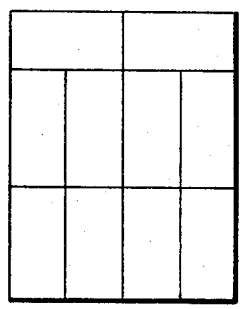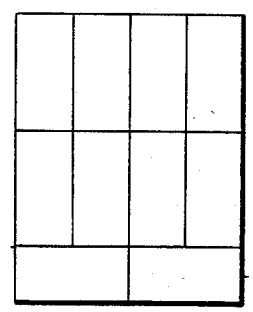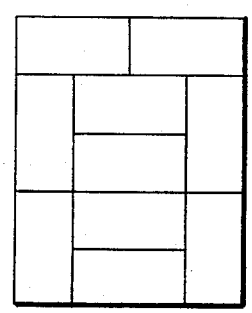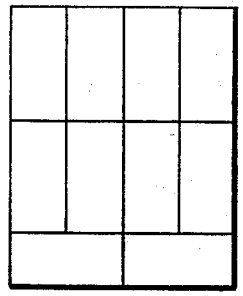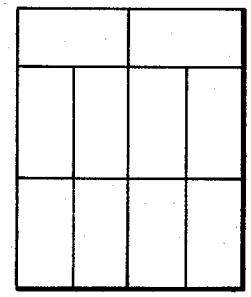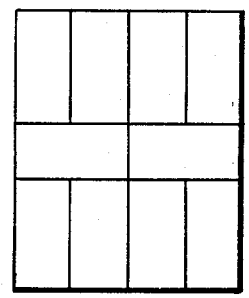

HAY BALE LOADER

This invention relates to a device for handling rectangular objects and in particular a device for stacking said objects. This invention in its preferred embodiment is a self-propelled or drawn vehicle which will pick up hay bales from the ground, convey said bales to a conventional pallet and stack said bales thereon in any desired configuration or height to the capacity of said pallet. Hay bales then can be retrieved from a field and palletized for shipping or storage without being touched by human hands.

Hay is normally mowed, raked into windrows, and baled through the use of conventional farm machinery. Retrieving the conventional rectangular bales from a field, however, has traditionally been done by hand labor. In order to minimize hand labor, large cylindrical bales were used which could be moved only with a tractor or the like. Such bales, however, are difficult to transport, for example by truck, because of their cylindrical shape. They also are not conveniently stacked and are normally left in the open until ready for use as animal fodder.

The conventional rectangular bales, however, are much more suitable for stacking and palletizing. In palletized form a conventional forklift truck may be utilized to move the pallet and in such form the bales may be conveniently stacked in a barn or shipped by truck and/or railroad car. There remains a need, however, for a mechanized means to rapidly and efficiently retrieve such bales from a field and assemble the bales in a stack on a pallet for shipment.

The prior art contains a variety of devices intended to solve this problem. For example, in U.S. Pat. No. 3,788,495, and in U.S. Pat. No. 4,273,488, bale accumulators are described. The devices are intended to pick up bales, form them into a layer, and then stack the layer. However, as will be obvious to those skilled in the art, such a stack will be unstable unless the bales cross each other in the layers to thereby "cross-tie" the stack. Neither patent describes a means for manipulating the picked up bales so that they may be assembled into a conventional cross-tied stack.

Commonly bales are dimensioned 14"×18"×38" and are loaded on a pallet in layers of ten. In order to provide a "tied-in" load each layer of ten bales is patterned differently to ensure that bales on the edges are tied in. A pallet containing seventy bales or seven layers of ten bales each is normal in that the weight will be sufficient for a conventional forklift truck, and the loaded pallet will fit on a truck. However, as will be obvious to those skilled in the art, the device of the instant invention is suitable for stacking the bales in any predetermined number of layers.

While it is commonly known that rectangular objects can be conveyed by the use of rollers, as for example in U.S. Pat. Nos. 4,247,239 and 3,757,966, the device of this invention uses a modified roller which includes a helically wound rod so that the roller functions as a screw or an auger. In addition, the device of this invention utilizes a number of rollers, reversibly driven, so that when a bale is picked up it may be oriented either laterally to the direction of travel, or longitudinally and moved on the platform either laterally or forward or backwards. Accordingly, any particular bale may be picked up and oriented in any desired fashion to form a particular layer. When ten bales have been picked up and oriented to form a complete layer the device then lifts the layer and places it in position on the pallet. Because of the novel means for orienting bales, the pattern of bales may be changed for each layer to conform to the patterns used in stacking bales by hand.

The device of this invention also because of its versatility may be used to either pick up bales, or the procedure may be reversed to remove bales from the stack and off-load them one at a time.

Accordingly, it is the object of this invention to provide a machine which will load and stack rectangular objects such as hay bales automatically, without the necessity for manually manipulating the objects.

It is another object of this invention to provide a motorized device which will pick up hay bales from the ground, manipulate the bales into a layer of, for example, ten bales, and stack each layer on a pallet.

It is still another object of this invention to provide a motorized device which may be either self-propelled or drawn by a tractor which will load hay bales from the ground, manipulate the bales in any desired pattern to form a layer thereof, and which will then pick up the layer and stack the said layer on a pallet whereby successive layers may be built up on the pallet in a conventional tied-in load whereby end bales will not fall out of the stack.

It is yet another object of this invention to provide a motorized device for picking hay bales up from the ground individually, orienting said bales into a desired pattern of a layer of ten and stacking said layer on a pallet which is capable also of reverse operation to dismantle the stack and discharge said bales one at a time.

It is still another object of this invention to provide a machine for picking up rectangular bales of, for example, alfalfa hay from a field which will stack said bales on a pallet for shipment or storage whereby the palletized stack of bales may be moved from place to place with a conventional forklift truck so that said bales are removed from the field and either stored or shipped without being manually handled.

These and other objects will become readily apparent with reference to the drawings and following description wherein:

FIG. 1 is a plan view of the device of this invention with hay carriage removed;

FIG. 2 is a schematic cross-sectional view taken along lines 2—2 of FIG. 1;

FIG. 3 is a fragmentary perspective view taken along lines 3—3 of FIG. 1;

FIG. 4 is a fragmentary perspective view taken along lines 4—4 of FIG. 1 showing the accumulator rollers in the down position;

FIG. 5 is a view similar to FIG. 4 showing accumulator rollers in a raised position;

FIG. 6 is a partially schematic, fragmentary cross-sectional view taken along lines 6—6 of FIG. 1 showing the raising mechanism in a down position;

FIG. 7 is a view similar to FIG. 6 showing the raising mechanism in an up position;

FIG. 8 is a cross-sectional view taken along lines 8—8 of FIG. 6;

FIG. 9 is a cross-sectional view taken along lines 9—9 of FIG. 6;

FIG. 10 is a cross-sectional view taken along lines 10—10 of FIG. 7;

Figure 12:
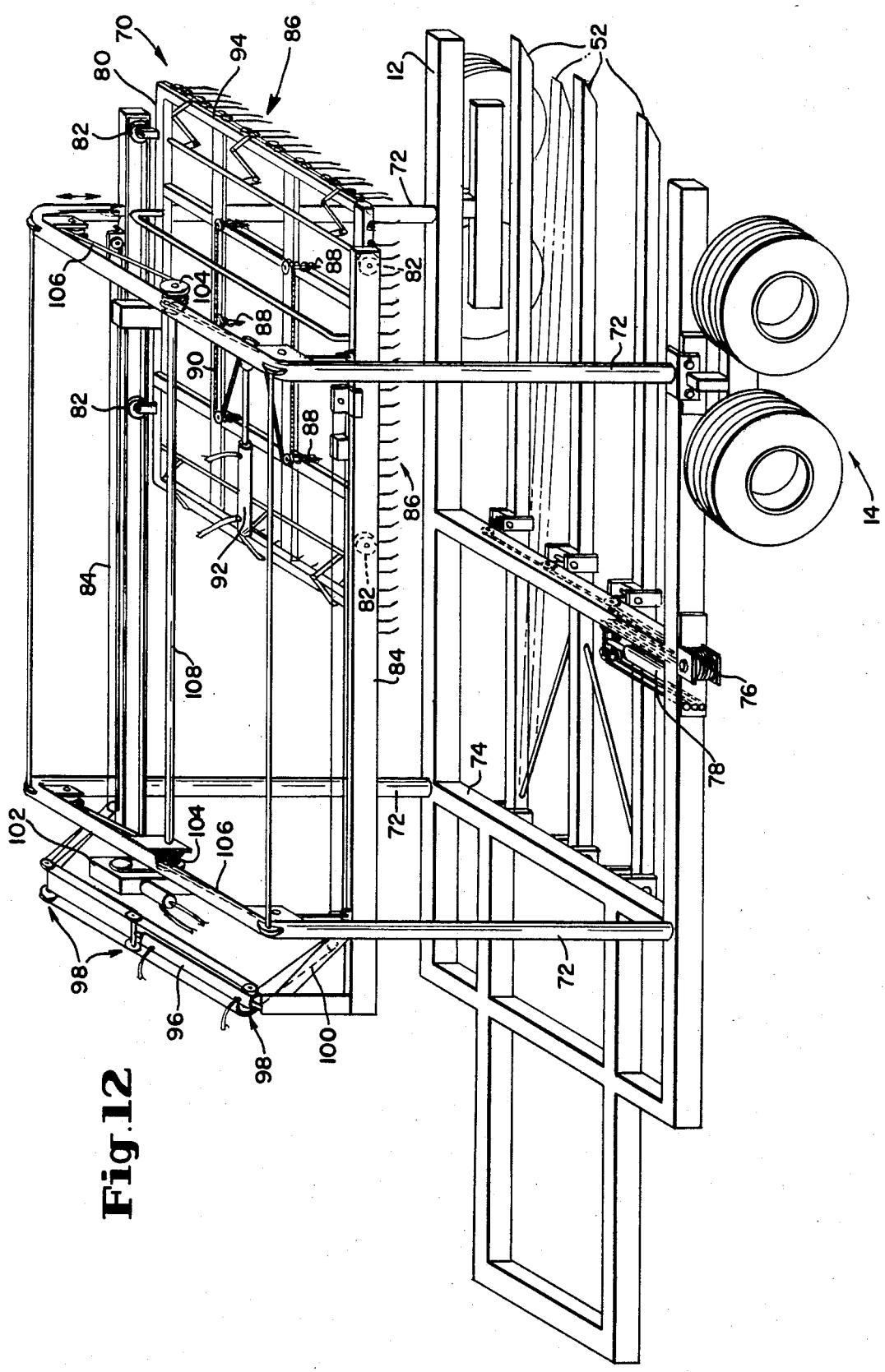
Figure 13:
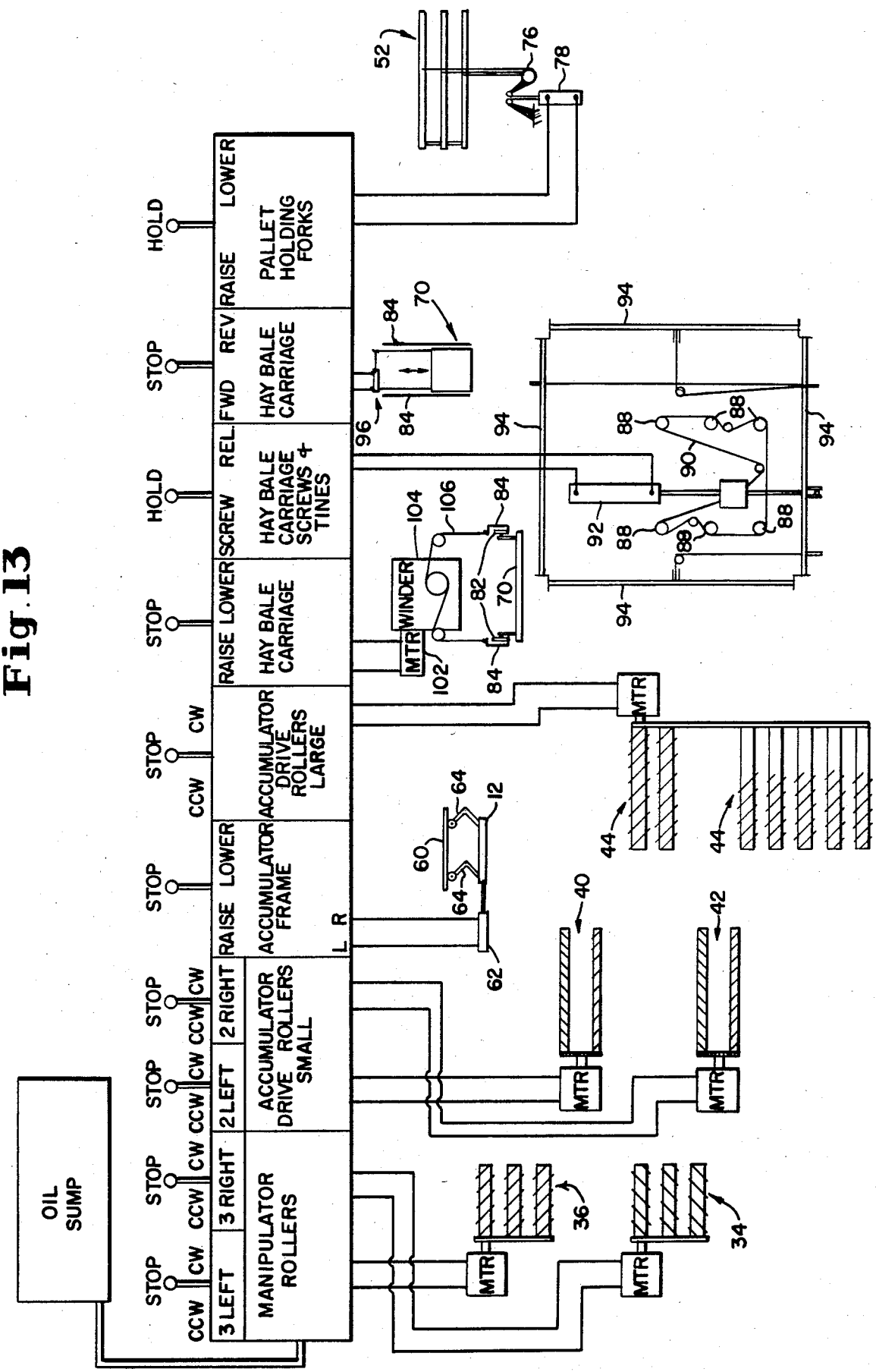

FIGS. 11a–g are schematic views of bales arranged, respectively, in layers 1-7 for stacking;

FIG. 12 is a partially schematic perspective view of the device of this invention with rollers removed to show the main frame and hay carriage;

FIG. 13 is a schematic view of the hydraulic functions as controlled from the operator's seat.

With attention to the drawings and to FIG. 1 in particular, the device of this invention 10 is preferably self-propelled, but as will be obvious to those skilled in the art may be tractor drawn. As shown in FIG. 1, the device consists of a main frame 12 which is mounted in a conventional fashion on wheels 14. A cab 16 is provided for the driver and the cab contains a control panel 18 for controlling the various mechanisms for loading and stacking hay bales as will be subsequently described. An engine 20 preferably drives the vehicle in a conventional fashion.

The device includes a bale pick-up conveyor 22. Conveyor 22 is illustrated with a toothed chain 24 which rotates to engage bales (not shown) one at a time on the ground and raise them to the bale manipulator 26. While a toothed chain 24 is shown herein, it will be obvious to those skilled in the art that other conveying mechanisms may be used such as a belt, multiple chains, or the like.

With attention to FIGS. 1 and 2, the bale manipulator 26 is designed to orient a bale picked up by the conveyor 22 so that it is disposed either parallel to the longitudinal axis of the device, or laterally thereto. As used hereinafter, lengthwise will refer to orientation of a bale parallel to the longitudinal axis, and crosswise will refer to a bale oriented perpendicular to the longitudinal axis.

Bales are manipulated through the action of screw augers. As shown, for example, in FIG. 3, each auger consists of a shaft 28 having helically wound rods 30. The movement of bales through the manipulator 26 and into the accumulator 32 is by action of these screw augers. The screw augers used in both the manipulator 26 and the accumulator 32 are reversible and preferably chain driven. It will be obvious to those skilled in the art, however, that another type of drive means could be utilized as will be subsequently explained.

With reference to FIG. 2, the manipulator 26 consists of two sets of three screw augers 34 and 36. A bale from the pick-up conveyor 22 then enters initially augers 34 where it is conveyed lengthwise at least part way beyond the hinged gate 38 as shown in FIG. 3. If it is desired to turn the bale crosswise, augers 34 are reversed against the action of gate 38 and the bale end is delivered to augers 36. When the bale has been turned augers 34 will be reversed again so that the bale may be conveyed in its crosswise configuration to the accumulator 32. If it is desired to orient the bale lengthwise, it is merely conveyed straight back by augers 34. As will subsequently be explained, the control system for engaging and reversing augers 34 and 36 is on the control panel 18. Each bale picked up by conveyor 22 then is oriented in the desired position in manipulator 26 before it is conveyed back to the accumulator 32.

With reference to the accumulator 32, and FIGS. 4 and 5, two sets of augers 40 and 42 are preferably provided which function in combination normally with the manipulator augers 34 and 36. When the manipulator has oriented a bale, either lengthwise or crosswise, it is then conveyed by rollers 34 and 36 to the accumulator 32. The bale then normally engages augers 40 and 42 and is conveyed in its oriented position to the rear of the accumulator 32. Preferably five oriented bales are fed onto the accumulator until the augers 40 and 42 are full. When augers 40 and 42 are full, the accumulator will be half-full. The accumulator also includes augers of a larger diameter 44 which are normally recessed below augers 40 and 42 as shown, for example, in FIG. 4. Augers 44 are disposed in a mutually spaced relationship along the accumulator 32 from one side to the other. The augers are chain driven preferably and reversible. When augers 40 and 42 are full, augers 44 are raised and the oriented bales on the accumulator are conveyed in a group across the accumulator to make way for a second group of preferably five bales which are individually oriented in the manipulator 26 and then conveyed into the accumulator on augers 40 and 42. As shown in FIG. 1, augers 44 may be supplemented by rollers 44′ which may have a lengthwise rod attached thereto (not shown) for additional frictional engagement with the bales. Augers 44 then are equipped with helically wound rods 30 as shown in FIG. 3 which may extend the entire length thereof or part way, and may be supplemented by either smooth rollers 44′ or rollers having an additional friction means such as one or more longitudinal rods mounted thereon.

With reference to FIG. 1, a conventional pallet 50 is normally mounted on hinged forks 52 for receiving preferably ten bales at a time from the accumulator. A layer of ten bales then is moved as will be subsequently explained from the accumulator 32 onto the pallet 50. The accumulator is then empty for a repeat of the loading process and the loading process continues until the desired number of layers of bales have been accumulated on the pallet 50. As will be subsequently explained, normally ten bales form a layer and seven layers are loaded onto the pallet 50. The pallet may then be moved with a conventional forklift truck or as also will be subsequently explained, the hinged forks rotated downwardly so that the pallet may be off-loaded onto the ground by advancing the machine 10 forwardly.

With reference to FIGS. 6–10, the rollers 44 are mounted on an accumulator platform 60 which in turn is normally supported on the main frame 12. The augers 40 and 42 are mounted on the main frame.

When it is desired to raise augers 44, preferably a hydraulic cylinder 62 is activated as shown in FIG. 7 and bell cranks 64 which mount rollers 66 are rotated from the position shown in FIG. 6 to the position shown in FIG. 7. The movement is also shown in FIG. 8 from the down position to the raised position wherein the accumulator platform 60 is shown in phantom.

An L-shaped flange 68 is mounted longitudinally on the outermost roller 44 as shown in FIGS. 4 and 5. When the accumulator platform is raised to the position shown, for example, in FIG. 7, roller 44 is rotated so that the flange 68 will rotate from the position shown in FIG. 4 to the position shown in FIG. 5. See also FIGS. 9 and 10 which correspond thereto. This movement is provided by a linkage 70 which interconnects the main frame 12 and a lever arm 72 mounted on member 44. Flange 68, as will be subsequently explained, serves to engage bales firming up the layer for movement from the accumulator 32 to the pallet 50.

With attention to FIGS. 11a–g, in order to stack rectangular objects such as hay bales so that the objects on the edges will not fall out, it is necessary to overlap each successive object. With hay bales the term "tied in" load refers to such an overlapped or crosslapped stack. FIGS. 11a–g are respectively layers 1–7 of such a stack. As will be obvious from the foregoing discussion, the device of this invention is capable of assembling a layer of bales in any particular configuration whereby the longitudinal axis of the bale is either lengthwise or crosswise to the longitudinal axis of the bed or pallet. To applicant's knowledge, no other automated device for assembling hay bales is capable of providing the successive orientations shown in FIGS. 11a–g. When layers 1–7 are assembled one on top of the other into a stack, the stack will be sufficiently cross tied by overlapping bales as to remain stable when transported.

With reference to FIGS. 1 and 12, an overhead carriage 70 is utilized to move a layer of bales from the accumulator 32 to the pallet 50. The carriage 70 functions as a hay fork to descend upon the layer in the accumulator 32, pick the layer up, move the layer rearwardly over the pallet 50, and then descend to place the layer on the pallet. Carriage 70 normally rides on the layer of hay to further keep individual bales from falling out as the vehicle moves through a field.

Carriage 70 is mounted on the main frame 12 by four upright supports 72 shown in FIG. 12 and shown in cross-section in FIG. 1.

A pallet 50 shown in FIG. 1 is normally received on fork 52. Fork 52 is hingedly attached to a cross member 74 and may be raised and lowered by a pulley 76 arrangement through a hydraulic cylinder 78. Accordingly, when the pallet 50 is full, fork 52 may be lowered by rotating it downwardly about its connection to cross member 74, whereby the pallet may be slid from the fork onto the ground.

Carriage 70 consists of a frame 80 suspended by roller wheels 82 in tracks 84. Frame 80 mounts peripheral biased fingers 86 which function to hold bales. The frame 80 is generally dimensioned to contain a layer of 10 bales.

Six screw members 88 are rotatably mounted on the interior of frame 80. Screw members are intended to engage and hold bales interior to the layer. A chain drive 90 which is reversible by action of hydraulic cylinder 92 functions to rotate screw members 88 in either a clockwise or a counterclockwise direction. The bale containing fingers 86 are rotatably mounted on frame 80 by shafts 94. Shafts 94 are linked to hydraulic cylinder 92 by a conventional linkage (not shown). Shafts 94 are intended to be rotated inwardly to cause fingers 86 to engage bales at their peripheral surfaces, and conversely to rotate outwardly to disengage the bales.

Typically in operation, when frame 80 engages the surface of bales, screw members 88 will be rotated twice, for example, in order engage the bale surfaces of the interior bales and then fingers 86 will be rotated inwardly to engage the peripheral surfaces of the bales. Typically this movement is controlled by the hydraulic cylinder 92.

Carriage 70 is translated horizontally by rollers 82 in tracks 84. Hydraulic cylinder 96 operates a pulley arrangement 98 whereby a cable 100 which extends in both tracks 84 may be operated to translate the carriage horizontally along the tracks. Carriage 70 is moved vertically by action of hydraulic motor 102 through a pulley arrangement 104 and cables 106. A shaft 108 interconnects pulleys 104 and shaft 108 is driven by motor 102. The motor 102 is reversible and thereby functions to raise and lower the carriage.

With attention to FIGS. 1, 12, and 13, when a bale enters conveyor 22 to manipulator 26, rollers 34 and 36 cooperate to manipulate the bale around hinged gate 38 to orient the bale either crosswise or lengthwise. Rollers 34 then send the bale rearwardly into accumulator 32 where it is received by rollers 40 and 42 and further translated rearwardly to the rear end of said rollers. Each successive bale entering is similarly handled until, for example, five bales are in the accumulator 32 on rollers 40 and 42. The large drive rollers 44 are then raised and rotated to translate the accumulated bales laterally across the accumulator to make room for an additional five bales. When ten bales are accumulated on the accumulator forming a layer, rollers 44 are reversed to firm the layer up against flange 68.

The carriage 70 is then raised by motor 102 and translated forward by motor 96 until it is aligned with the layer of bales. The carriage is then lowered by reversing motor 102 until the screws 88 engage the bale tops. Screws 88 are then rotated by action of motor 92 until they are secured in the bales and shafts 94 are rotated to engage fingers 86 in the peripheral surfaces of the outside bales.

Motor 102 is then activated to raise the carriage and motor 96 is activated to translate the carriage rearwardly until carriage 70 is disposed over pallet 50. Motor 102 is then reversed to lower the carriage 70 and bales contained therein onto pallet 50. This operation is repeated successively until the desired number of layers are disposed on top of pallet 50. At this point if ten bales are assigned to each layer and seven layers are stacked successively, the device will be fully loaded and can be returned to the barn or other place of storage.

In order to remove the pallet from the frame 12, motor 102 is again engaged to raise carriage 70. Motor 78 is then engaged to lower the fork 52 so that the ends thereof are on the ground. The device of this invention 10 then may be driven away to leave the pallet on the ground for further movement with a forklift truck. In the alternative, a forklift truck could be utilized to remove the pallet directly from fork 52 without lowering the ends thereof if desired.

The pallet fully loaded with hay bales then is ready for storage or transportation.

It should be noted that FIG. 13 does not include a control for the conveyor 22. Conveyor 22, as previously noted, may be any suitable type of conveyor. In FIG. 3, the conveyor 22 consists of a toothed chain 24 which is chain driven by chain 25 which causes shaft 27 to rotate. Chain 25 may also drive a roller 29 as desired. Operation of conveyor 22 then may be by an attachment to the power takeoff on a tractor or similar drive system and controlled merely by an on-off switch (not shown).

As will be obvious to those skilled in the art, the screw augers used throughout are mutually spaced and designed not to engage twine or similar binding material on the bales. Furthermore, the screws 88 in carriage 70 are also mutually spaced so as not to break the twine when the screws enter the bales for holding purposes.

In summary, the device of this invention is designed to retrieve hay bales from the ground, orient the bales into any desired layer design, and stack the layers successively on a wooden pallet without the necessity for manually moving the bales. The device is designed to form a "tied in" load so that the palletized bales may be easily transported without danger of the stack coming apart. In addition, the carriage used to move the layers normally rests on the last or highest layer so that when the device is returning from a field to a storage barn, for example, the carriage further functions to stabilize the load against bumps.

The invention may be embodied in other specific forms without departing from the spirit or essential characteristics thereof. The present embodiment is, therefore, to be considered in all respects as illustrative and not restrictive, the scope of the invention being indicated by the appended claims and all changes which come within the meaning and range of equivalency of the claims are, therefore, intended to be embraced therein.

What is claimed is:

1. A machine for handling rectangular objects which is adapted to pick up hay bales individually from a field and assemble a plurality of said bales in a stack on a pallet carried thereby comprising:
   a frame having a forward portion, a central portion and a rear portion, wheel means supporting said frame and directional drive means coupled thereto for movement thereof in a predetermined horizontal direction;
   pick-up conveyor means mounted on the forward portion of said frame for picking up successively individual bales from a field and depositing them in forward portion of said frame;
   manipulator means disposed adjacent said pick-up means for receiving each bale and for longitudinally orienting each bale selectively transverse to the direction of travel or parallel thereto;
   accumulator means disposed in the central portion of said frame for receiving each bale from the manipulator means and for assembling each bale, successively, into a layer wherein each bale is disposed in a predetermined longitudinal orientation transverse or parallel to the direction of travel;
   removal bale support means carried by the rear portion of said frame for successively receiving layers of bales;
   carriage means movable between the rear and central portions of said frame for successively securing an assembled layer of bales on said accumulator means, raising said layer vertically, translating said layer rearwardly, lowering said layer onto said support means and holding said layer on said support means whereby a predetermined number of successive layer will be assembled on said support one on top of another in a stack and held in place as said machine moves in the predetermined horizontal direction.

2. The machine of claim 1 wherein said carriage means further comprises external engaging means for engaging bales on the outside edge of said layer and urging them inwardly and internal engaging means for attachment to the bales on the inside of the layer so that when said carriage means raises said layer vertically said bales will occupy a common horizontal plane.

3. The carriage means of claim 2 wherein said external engaging means includes a predetermined number of mutually spaced, biased finger members surrounding said layer.

4. The carriage means of claim 2 wherein said internal engaging means includes a plurality of mutually spaced rotatable screw members adapted to be augered into the inside bales.

5. The machine of claim 4 wherein said screw members are spaced so that at least one engages each bale whether oriented transverse or longitudinal the direction of travel.

6. The machine of claim 1 wherein each layer comprises 10 bales.

7. The machine of claim 6 wherein said carriage means is adapted to translate up to 7 layers from the accumulator means to form a stack on the support means.

8. The device of claim 7 wherein said support means includes a pallet for supporting said stack which may be removed from said machine with a forklift truck.

9. The device of claim 8 wherein said support means includes a fork member adapted to engage said pallet and means for pivoting said fork member between a position wherein the fork member is contained within a horizontal plane to a position wherein the fork member is contained within a plane disposed at a downwardly directed accute angle to the horizontal.

10. The device of claim 1 wherein the manipulator means further includes a plurality of screw auger members and reversible drive means for rotating said members.

11. The device of claim 1 wherein the accumulator means includes a plurality of screw auger members and reversible drive means for rotating said members.

* * * * *